(12) United States Patent
Kopetz et al.

(10) Patent No.: US 10,488,864 B2
(45) Date of Patent: Nov. 26, 2019

(54) FAULT-TOLERANT METHOD FOR RECOGNIZING ERRORS IN AN ELECTRONICS SYSTEM FOR OPERATING A CONTROLLED OBJECT

(71) Applicant: TTTech Computertechnik AG, Vienna (AT)

(72) Inventors: Hermann Kopetz, Baden (AT); Stefan Poledna, Klosterneuburg (AT); Georg Niedrist, Guntramsdorf (AT); Eric Schmidt, Grosskrut (AT); Christopher Helpa, Vienna (AT)

(73) Assignee: TTTech Auto AG, Vienna (AT)

( * ) Notice: Subject to any disclaimer, the term of this patent is extended or adjusted under 35 U.S.C. 154(b) by 132 days.

(21) Appl. No.: 15/920,922

(22) Filed: Mar. 14, 2018

(65) Prior Publication Data
US 2018/0267550 A1 Sep. 20, 2018

(30) Foreign Application Priority Data
Mar. 17, 2017 (EP) .................................... 17161534

(51) Int. Cl.
*G05D 1/02* (2006.01)
*G05D 1/00* (2006.01)
(Continued)

(52) U.S. Cl.
CPC ......... *G05D 1/0214* (2013.01); *G05D 1/0088* (2013.01); *B25J 9/1674* (2013.01);
(Continued)

(58) Field of Classification Search
CPC .... G05D 1/104; G05D 1/0061; G05D 1/0214; G05D 1/0088; G05D 1/0027;
(Continued)

(56) References Cited

U.S. PATENT DOCUMENTS 9,523,984 B1 * 12/2016 Herbach .............. B62D 15/025
9,575,859 B2    2/2017 Poledna
(Continued)

FOREIGN PATENT DOCUMENTS

EP    2881829 A2    6/2015

OTHER PUBLICATIONS

Extended European Search Report issued in Application No. 17161534. 7, dated Aug. 29, 2017 (9 pages).
(Continued)

*Primary Examiner* — Behrang Badii
(74) *Attorney, Agent, or Firm* — Eversheds Sutherland (US) LLP

(57) ABSTRACT

The invention relates to a method for operating a controlled object, that is embedded in a changing environment, wherein the controlled object and its environment are periodically observed using sensors, and, in each frame, at least three independent data flow paths (DFPs) are executed based on the data recorded through the observation of the controlled object and its environment. A first DFP determines from the data collected through the observation of the controlled object and its environment via complex software a model of the controlled object and of the environment of the controlled object and conducts a trajectory planning, in order to create one or a plurality of possible trajectories, that, under the given environmental conditions, correspond to a specified task assignment; and a second DFP, from the data collected through the observation of the controlled object and its environment via preferably diversitary, complex software, determines a model of the controlled object and of the environment of the controlled object and specifies a safe space-time domain, SRZD, within which SRZD all safe trajectories must be located; a third DFP determines from the data collected through the observation of the controlled (Continued)

Figure 1:
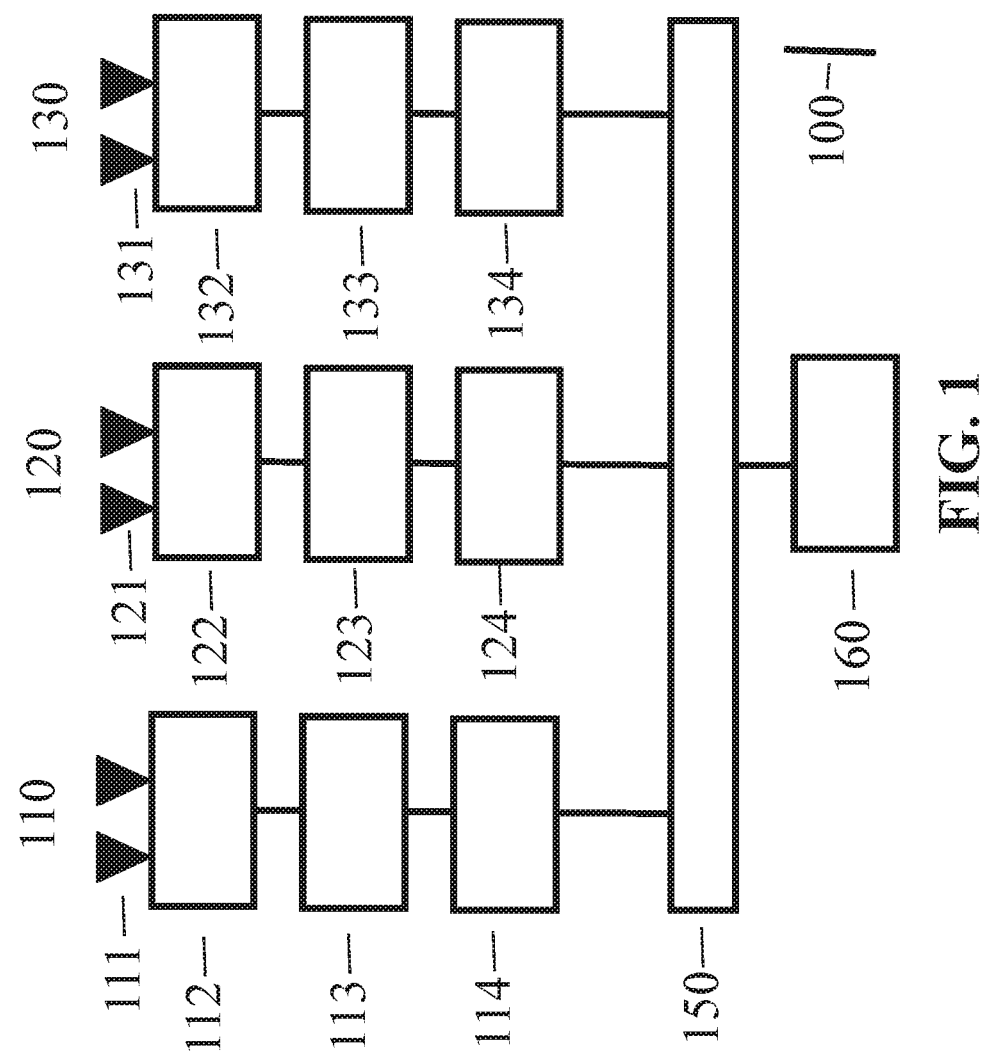

object and its environment a model of the controlled object and its environment and, based on this model, calculates an emergency trajectory, and wherein in normal operation a deciding instance verifies whether the emergency trajectory is located within the safe space-time domain (SRZD).

12 Claims, 3 Drawing Sheets

(51) Int. Cl.
G08G 5/00 (2006.01)
G08G 1/16 (2006.01)
B62D 15/02 (2006.01)
B64G 1/26 (2006.01)
G01S 19/49 (2010.01)
B60W 50/00 (2006.01)
B25J 9/16 (2006.01)
G05D 1/10 (2006.01)
B64C 39/02 (2006.01)
B60H 1/00 (2006.01)
B64G 1/24 (2006.01)

(52) U.S. Cl.
CPC ..... B60H 1/00064 (2013.01); B60W 50/0098 (2013.01); B62D 15/025 (2013.01); B62D 15/0265 (2013.01); B64C 39/02 (2013.01); B64G 1/242 (2013.01); B64G 1/26 (2013.01); G01S 19/49 (2013.01); G05D 1/0061 (2013.01); G05D 1/104 (2013.01); G08G 1/166 (2013.01); G08G 5/0013 (2013.01)

(58) Field of Classification Search
CPC ................ G05D 1/0257; B62D 15/025; B62D 15/0265; G08G 5/0013; G08G 5/0069; G08G 5/0082; G08G 5/0039; G08G 5/0034; G08G 1/166; G08G 1/162; G01S 19/49; G01S 5/0263; G01S 5/02; B64C 39/024; B60W 50/14; B60W 40/08; B60W 10/20; B60W 10/18; B60W 50/082; B60W 50/12; B60W 40/04; B60W 50/0225; B60W 30/181; B60W 30/18009; B60W 30/09; B60T 7/00; B60T 7/18; B60T 7/22; B60K 28/06; B60K 28/10; B60Q 1/52; B60Q 5/005
See application file for complete search history.

(56) References Cited

U.S. PATENT DOCUMENTS

| 2008/0097699 | A1  | 4/2008  | Ono |
|---|---|---|---|
| 2014/0158830 | A1* | 6/2014  | Rossettini ............. B64G 1/242 244/158.6 |
| 2016/0033965 | A1  | 2/2016  | Kopetz |
| 2017/0210391 | A1* | 7/2017  | Dudar ................ B60H 1/00064 |
| 2017/0262330 | A1  | 9/2017  | Kopetz |
| 2017/0297569 | A1* | 10/2017 | Nilsson ................ G05D 1/0061 |
| 2018/0047295 | A1* | 2/2018  | Ricci ...................... G05D 1/104 |
| 2018/0052453 | A1  | 2/2018  | Poledna et al. |

OTHER PUBLICATIONS

Avizienis, A. The N-Version Approach to Fault-Tolerant Software, IEEE Trans. On Software Engineering, 1985, vol. 11, pp. 1491-1501.

Kopetz, H. Real-Time Systems, Design Principles for Distributed Embedded Applications. Springer Verlag, 2011, pp. 6-9, 84-88, 128-130.

FAA. Advisory Circular System Safety Assessment for Part 23 Airplanes. URL: http://www.faa.gov/documentLibrary/media/Advisory_Circular/AC%2023.1309-1E.pdf, retrieved on Aug. 11, 2016 (56 pages).

Wikipedia, Automotive Safety Integrity Levels ISO 26262, retrieved on Aug. 11, 2016 (9 pages).

Wikipedia, Autonomous Driving, retrieved on Aug. 11, 2016 (12 pages).

* cited by examiner

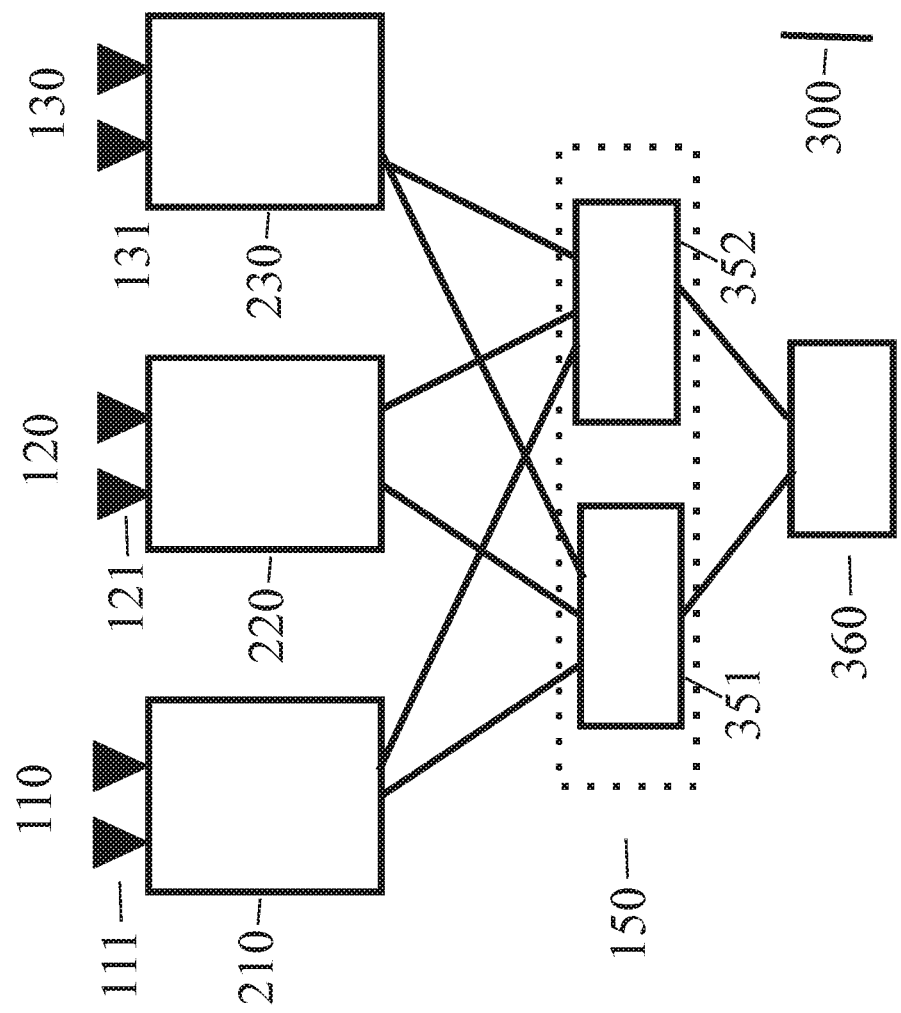

FAULT-TOLERANT METHOD FOR RECOGNIZING ERRORS IN AN ELECTRONICS SYSTEM FOR OPERATING A CONTROLLED OBJECT

CROSS-REFERENCE TO RELATED APPLICATIONS

This application claims priority to and the benefit of EP application No. 17161534.7, filed Mar. 17, 2017, which is incorporated by reference herein in its entirety.

The invention relates to a method for operating a controlled object, for example a vehicle that is embedded in a changing environment, wherein the electronic system that implements the control system includes sensors, in particular a plurality of sensors, actuators, in particular a plurality of actuators, and node computers, in particular a plurality of node computers, which exchange data via a real-time communication system.

The invention further relates to an electronic system, for example a computer system, for operating a controlled object, for example a vehicle, that is embedded in a changing environment, wherein the electronic system that implements the control system includes sensors, in particular a plurality of sensors, actuators, in particular a plurality of actuators, and node computers, in particular a plurality of node computers, which exchange data via a real-time communication system.

Finally, the invention relates to a controlled object having such an electronic system.

The present invention is within the field of computer technology. It relates to a method and an electronic system for fault-tolerant operation of a controlled system, in particular of an autonomous controlled object, in particular of a vehicle.

The developments in sensor technology and computer technology permit the largely autonomous control of technical systems and objects, such as a vehicle, that autonomously controls its destination.

According to Wikipedia [4], the classification of autonomous driving is organized into six levels:

Level 0: "Driver only", the driver himself drives, steers, accelerates, brakes, etc.

Level 1: Designated assistance systems help with vehicle operation (including ACC).

Level 2: Partial automation. Among others, automatic parking, lane-keeping function, general longitudinal guidance, acceleration, braking etc. are taken over by the assistance system (such as traffic jam assistance).

Level 3: High-level automation. The driver does not have to monitor the system continuously. The vehicle conducts independent functions such as activating the turn indicator, lane changes and lane tracking. The driver can attend to other things but is required to take over driving from the system within a preliminary warning period, as needed. This form of autonomy is technically feasible on highways. The legislature is working towards permitting Level 3 vehicles. There is talk of a time frame by 2020.

Level 4: Full automation. The guidance of the vehicle is continuously taken over by the system. If the driving tasks are no longer managed by the system, the driver may be required to take over the driving.

Level 5: Full autonomy of the vehicle. The vehicle is provided without a steering wheel, the vehicle can move around without a driver.

Level 2 has been currently implemented in vehicles available on the market. At Level 2, the driver is required to continually monitor the proper functioning of the computer system and to intervene immediately in the event of a fault. At the higher automation levels, the computer system must be designed to be error tolerant in order guarantee the safety of the vehicle even in the event of an error in the computer system.

In the ISO 26262 standard, an electronic system (hardware plus software) in a vehicle must be assigned to one of four integrity levels (Level ASIL A to ASIL D), wherein the Level ASIL D represents the highest level of integrity [5]. The integrity of electronic systems for fully automated vehicle operation (Level 4 and Level 5) must conform to ASIL D. Whereas the probability for an occurrence of a dangerous error having serious implications for the safety of a vehicle at Level ASIL B must be less than $10^{-6}$ per hour (d.s. 103 FIT), this probability at ASIL D must be less than $10^{-8}$ per hour (d.s. 10 FIT).

The cause for the occurrence of a failure of an electronic system may be an error due to hardware aging (physical fault) or a design error (design fault) in the hardware or software.

An aging error is present if an assembly that was fully functional at the beginning of its useful life fails because of aging processes of the hardware. For state of the art automotive chips, the permanent error rate for errors due to aging is <100 FIT. By using active redundancy (TMR or self-checking components), the required error rate for ASIL D (less than 10 FIT) can be achieved in the hardware.

Design errors may be present in the hardware or in the software. The consequences of hardware design errors can be mastered using the active redundancy of diverse hardware.

Measures that result in a reduction in the probability of the presence of an undetected design error in the software are: a systematic design process, verification and validation, primarily by comprehensive testing.

A significant cause for the occurrence of design errors in the software is the complexity of the software. According to the state of the art, it is possible to so thoroughly validate a complex software system that the required error rate for ASIL B can be achieved, but not that of ASIL D.

It corresponds to the prior art in that control systems (which are the systems for real-time operation and/or control of a controlled object), such as a material electronic system, run periodically [8, p. 7]. The controlled object is observed at periodic observation instants (sampling points). The data collected as a result of this form the basis for the calculation, preferably as quickly as possible, of (new) target values for actuators that influence the behavior of the controlled object.

We describe the periodically repeating execution of a sequence of possibly distributed calculations that is implemented after each observation as a frame.

The sequence of software processes that must be executed within a frame is defined as one or more data flow paths (DFP).

Two time parameters are connected to each frame:

The execution time specifies the time interval between the sampling point and the instant of the output of the results of the frame to the actuators of the object to be controlled. The shorter the execution time of a frame, the better the quality of a control system.

The frame interval (sampling time) specifies the time lag between two consecutive sampling points.

It is an object of the invention to increase the reliability of the operation of a controlled object.

This object is achieved by a method of the aforementioned type and by an electronic system of the aforementioned type, e.g. in that the controlled object and its environment are periodically observed by a computer system using sensors, and, in each frame, at least three independent data flow paths DFPs are executed based on the data recorded through the observation of the controlled object and its environment, wherein, for example, for each DFP, the observation is carried out via different sensors, and wherein
- a first DFP determines from the data recorded by the observation of the controlled object and its environment via a complex software a model of the controlled object and of the environment of the controlled object and, on the basis of this model, carries out a trajectory planning in order to create one or a plurality of possible trajectories that, under the given environmental conditions, correspond to a specified task assignment, and wherein
- a second DFP determines from the data recorded by the observation of the controlled object and its environment via a, preferably diversitary, complex software program a model of the controlled object and of the environment of the controlled object and, on the basis of this model, determines a safe space-time domain, SRZD, within which SRZD all safe trajectories must be located, and wherein
- a third DFP determines from the data recorded by the observation of the controlled object and its environment a model of the controlled object and its environment and, on the basis of this model, calculates an emergency trajectory, and wherein in normal operation a deciding instance verifies whether the emergency trajectory is located within the safe space-time domain (SRZD).

The present invention discloses a method and a hardware architecture for increasing the reliability of a complex electronics system. By targeted use of hardware and software redundancy, the reliability of the electronic system is significantly increased. By targeted use of hardware and software redundancy, the latent failure of the emergency operating system is immediately recognized.

For example, each DFP can use the observations of all of the sensors. It can also be provided, however that each DFP uses only the observations of specified sensors and, it can also be provided, for example, that each DFP only uses sensors, meaning their observations, specifically assigned to it.

The sensors are preferably synchronized, meaning all sensors conduct their observations simultaneously (periodically).

The DFPs are preferably each executed in one frame simultaneously. This means that, on one hand, observations of the sensors take place simultaneously (see above), so that the DFPs begin at the same time, and that, in addition, the results of the DFPs are transmitted to the deciding instance at the same instant.

In the field of safety technology in air and space travel, a distinction is made between simple and complex software [6]. If the software that is used is simple and formally verified and/or can be comprehensively tested, it is then assumed that the required error rate for ASIL D can be attained through a careful development process.

If the software that is used is complex, we assume that the probability for the occurrence of design errors corresponds to that of ASIL B. Through software redundancy, meaning the parallel execution of two or more diversitary ASIL B software systems with a subsequent, usage-specific comparison of the results, the reliability of the software can be significantly increased. A method for increasing software reliability by active redundancy (by means of diversitary software) is described in [7]. This method is not applicable, however, if the diversitary software versions do not behave in a replica deterministic manner.

Diversitary software is not replica deterministic if there is a non-deterministic design construct (NDDC) [8, p. 128] in the software. An NDDC differentiates between two correct but incompatible scenarios. In general, it cannot be assumed that two diversitary versions of the software having NDDCs will arrive at comparable results.

If, for example, a boulder is lying in the street and a decision must be made whether this boulder should be bypassed on the left or the right, it cannot be generally assumed that two diversitary software versions will arrive at the same result. Although both results are correct, they are not replica deterministic. Error tolerance is thus lost.

The autonomous operation of a motor vehicle requires a software system for image recognition, environmental modeling and trajectory planning. This software system is not simple, but rather complex and includes NDDCs.

It is preferably proposed to divide the complete software system into two parts. One part comprises the complex software. The second part comprises the simple software, preferably having NDDCSs.

The reliability of the complex software is significantly increased by the functional redundancy of a plurality of two or more different versions of the complex software that are executed on independent fault containment units (FCUs). The reliability of the simple software is achieved through exhaustive testing and formal analyses.

In order to effect a broad software diversity of the complex software, one software version calculates one or more suitable trajectories in the space-time continuum, while another independent software version determines a structure in the space-time continuum, within which each safe trajectory must be located. A third independent software version determines an emergency trajectory that guides the vehicle to a safe state.

A deciding instance that is implemented in simple software without software redundancy and preferably comprises NDDCs verifies the alternative results prepared by the complex software and decides which alternative is selected. This simple software is executed on preferably error-tolerant hardware in order to mask hardware errors that arise.

The present invention describes an innovative method by which a complex electronic system for controlling an, in particular, safety-critical controlled object, for example driving an autonomous vehicle, can be implemented. A decision is made between simple and complex software, wherein the simple software is preferably implemented on error-tolerant hardware and wherein, for example, a plurality of diversitary versions of a complex software are simultaneously implemented on independent fault containment units (FCU) and where a result that is to be passed on to the actuators is selected by a deciding instance that is implemented via a simple software from the results of the complex software.

Advantageous embodiments of the method or the system according to the invention are explained below:
- The calculations of the deciding instance can be executed on TMR hardware.
- The calculations of the deciding instance can be executed simultaneously on two independent self-checking hardware units.
- The results of the first and of the second DFP are transmitted to a deciding instance wherein the deciding instance is implemented via a simple software program, and wherein the deciding instance verifies whether at least one of the trajectories determined by the first DFP is safe, meaning is located within the SRZD that was determined by the second DFP, and wherein, in the case that these match, one of the safe trajectories determined by the first DFP is selected, and wherein the deciding instance transmits the target values corresponding to the selected trajectory to an actuator control, and wherein, in the case that these do not match, it waits for the results of at least one following frame, and wherein, in the case that there is also no safe trajectory available in the following frame or the one after that, the deciding instance switches to an emergency trajectory. If, therefore, it is determined in one frame that none of the trajectories established by the first DFP in this frame is safe, meaning that none of the trajectories is located within the SRZD established by the second DFP, then, as described above, it will wait for the result in at least one of the frames following the frame under consideration, and if in the next frame or the one following that (with respect to the frame under consideration) there is also no safe trajectory available, the deciding instance switches to an emergency trajectory.

The deciding instance can, in the case that the emergency trajectory is not available or is not safe, meaning is not located within the SRZD, transmit an alarm message, for example an alarm message to a user of the controlled object, e.g. to the driver of a vehicle.

Figure 2:
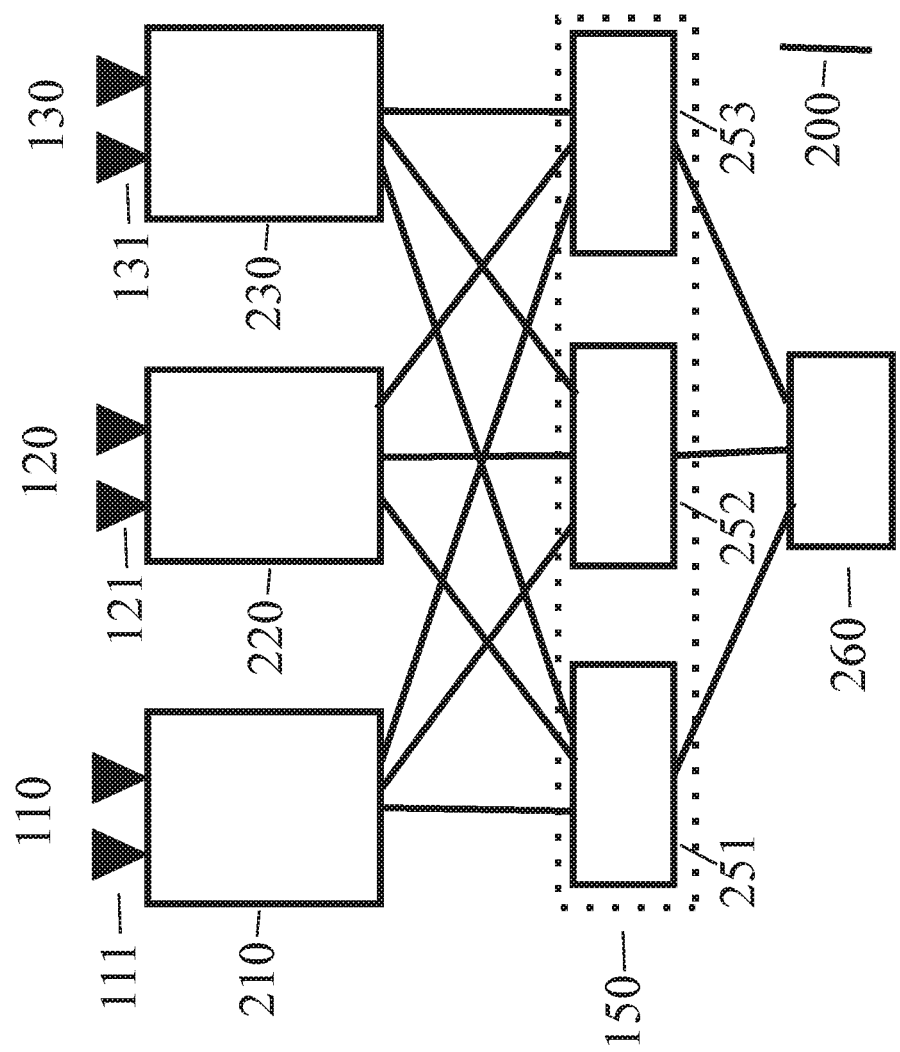

In the following, the invention is described using an exemplary embodiment illustrated in the drawings. Shown in the drawings are:

FIG. 1 a data flow diagram of a complex electronic system for autonomous control of a vehicle;

FIG. 2 a possible hardware architecture for implementing the complex electronic system of FIG. 1 having TMR hardware for implementing an NDDC, and FIG. 3 shows a possible hardware architecture for implementing the complex electronic system of FIG. 1 having self-checking hardware for implementing an NDDC.

The following concrete description of an implementation addresses one of the many possible executions of the new method using the example of an autonomous vehicle control system. The description uses terms that are described more precisely below. These terms apply not only in the context of the description of the figures, but also in connection with the complete disclosure.

A controlled object (abbreviated CO) is a technical system that is controlled by an electronic system, for example by a computer system, and/or a person and has the goal of performing a predetermined task over a period of time under specific environmental conditions. Examples of COs are: a vehicle, an airplane, an agricultural machine, a robot or a drone.

A statement of the problem for a drone could comprise flying to a specified target while observing a closed section of the airspace, or while attaining a specified minimum flight height.

An environmental model is a digital data structure that at a given instant represents an image of the essential characteristics of the environment for the previous description, in particular of the environment of a CO. An example of an environmental model is the description of a street and the static and dynamic objects found on the street at a given instant.

A trajectory is a path in the space-time continuum that a CO can follow in the course of time in order to complete a given task. The characteristics of the trajectories of a CO depend upon the design of the CO, the given task and the current environmental conditions. For example, one can refer to a possible path that a vehicle can follow or cover under given environmental conditions in order to reach its destination as a trajectory. A characteristic of a trajectory or of the trajectories can be, for example, the speed with which the trajectory is traversed.

A software process is understood to be the execution of a program system on one or more computers.

A fault containment unit (FCU) is an assembly that encapsulates the immediate consequences of an error cause (6, p. 155).

The term error-tolerant hardware is to be understood as a hardware architecture that masks hardware errors which arise corresponding to the aforementioned error hypothesis. Examples of such hardware architectures are triple modular redundancy (TMR) or the parallel implementation of software on self-checking assemblies as described in (6, p. 156). In accordance with the state of the art, the redundant FCUs receive their input data over at least two independent communications channels and transmit their output data over at least two independent communication channels.

A data flow path (DFP) is a sequence of distributed software processes, wherein the first software process reads input data and the output data of a previously stored software process represent the input data for the ensuing software process. The output data of the last software process are the result data of the DFP. In many usage cases of real-time data processing, the first software process of a DFP acquires the sensor data and the last software process of a DFP produces the target values for the actuators.

In most usage cases of real-time data processing, a DFP is cycled through. The time lag between two cycles is described as a frame. An inner state [8, p. 84] of a software process can be stored between two sequential frames of a DFP.

Two DFPs are diversitary if they pursue the same destination setting, but the software processes of the DFPs use different algorithms (algorithmic diversity) and/or different input data (data diversity).

An environmental modeling is a software process that creates an environmental model based on the static data of the environment and the dynamic data of the environment collected from different sensors.

A trajectory design is a software process that, on the basis of a given environmental model and a given objective, determines one or more possible trajectories which solve a predetermined task or objective.

The immediate future of an instant is that time interval that begins with the instant and ends as soon as the process (e.g. the vehicle) is in a safe state.

If, for example, 10 seconds are required in order to bring a vehicle to a standstill (safe state) and a sample rate of 30 frames per second is provided, the immediate future thus contains a sequence of 300 temporally equidistant instants.

A safe trajectory is a trajectory in the space-time continuum that describes the path of a process (e.g. of a vehicle) in the immediate future, wherein this path is free from obstacles and all relevant (e.g. driving dynamics) boundaries are observed.

If, for example, the road is wet, the driving-dynamic boundaries must be set differently than when the road is dry.

An emergency trajectory is a safe trajectory that guides the process (e.g. the vehicle) into a safe state.

A safe space-time domain (SRZD) is a tubular structure in the space-time continuum, in which all safe trajectories in the immediate future are contained.

A deciding instant is a usage-specific software process that receives a number of proposals as input data, analyzes these proposals and has the freedom to arrive at a decision as to which—possibly changed—proposal is selected. In many cases, a deciding instant is an NDDC.

The normal operation is characterized in that one of the trajectories is located in the safe space-time domain calculated by the trajectory planning.

For example, a deciding instant receives a number of proposals for possible trajectories of a vehicle as input and decides on one—possibly changed—trajectory that will be implemented.

FIG. 1 shows a data flow diagram of a complex electronic system for autonomous control of a vehicle. Vertical connection lines 100 of the box in FIG. 1 show the data flow from top to bottom.

In FIG. 1, three different DFPs 110, 120 and 130 are illustrated. Each of the DFPs provides observation of the environment of the vehicle via their own sensors. The sensors are read cyclically. First DFP 110 has sensors 111, second DFP 120 has sensors 121 and third DFP 130 has sensors 131. Examples of vehicle sensors are cameras, radar sensors, LIDAR sensors and ultrasound sensors. In the first processing step of the DFP, the raw sensor data are read off and pre-processed. That is software process 112 in DFP 110, software process 122 in DFP 120 and software process 132 in DFP 130.

It is advantageous, if software processes 112, 122 and 132 use different algorithms (algorithm diversity) that are supplied with different input data (data diversity).

It is advantageous, if sensors 111, 121 and 131 observe the environment simultaneously. Simultaneous observation can be achieved via a distributed trigger signal derived from an error-tolerant global time.

In the second processing step of the DFP, the environmental modeling is completed on the basis of the received sensor data and information about the static environmental parameters (e.g. from the maps of a navigation system). That is software process 113 in DFP 110, software process 123 in DFP 120 and software process 133 in DFP 130.

It is advantageous if software processes 113, 123 and 133 use different algorithms (algorithm diversity) that are supplied with different input data (data diversity).

In the third processing step of the first DFP 110, that is, of software process 114, a trajectory planning is implemented on the basis of the environmental model produced by second processing step 113.

In the third processing step of the second DFP 120, that is, of software process 124, a safe space-time domain (SRZD), in which all safe trajectories must be located, is determined on the basis of the environmental model produced by second processing step 123.

In the third processing step of DFP 130, that is, of software process 134, the emergency trajectory, which can guide the vehicle into a safe space within the immediate future, is calculated on the basis of the environmental model produced by second processing step 133.

Trajectory planning 114 in the third processing step of the first DFP 110 develops one or more alternative trajectories for reaching the destination that are offered to the subsequent software process, a deciding instance 150. The proposed trajectories can be evaluated by trajectory planning 114 from the standpoint of safety and effectiveness with respect to reaching the destination or objective.

Deciding instant 150, which is implemented in a simple software program, verifies whether the selected trajectory of trajectory planning 114 is located within the safe space-time domain (SRZD) determined by software process 124 of second DFP 120. If this is the case, the corresponding target values are transmitted to the actuators.

If none of the trajectories of trajectory planning 114 is located within the SRDZ calculated by software process 124, the deciding instant does not output new target values to the actuator, but waits for the following frame.

If also in the following frame none of the trajectories of trajectory planning 114 are located within the SRZD calculated by software process 124, the deciding instant chooses the emergency trajectory offered by software process 134 and brings the vehicle into a safe state.

FIG. 2 shows a possible hardware structure for implementing the DFPs in FIG. 1. The boxes in FIG. 2 represent assemblies. Connecting lines 200 of the assemblies in FIG. 2 show the available communication channels for transmitting data.

DFP 110 includes sensors 111 and assembly 210. DFP 120 includes sensors 121 and assembly 220. DFP 130 includes sensors 131 and assembly 230. Assembly 210 forms a fault containment unit (FCU) that contains the hardware components (node computer, data lines, storage) for implementing software processes 112, 113 and 114 of DFP 110. Assembly 220 forms a fault containment unit (FCU) that contains the hardware components (node computer, data lines, storage) for implementing software processes 122, 123 and 124 of DFP 120. Assembly 230 forms a fault containment unit (FCU) that contains the hardware components (node computer, data lines, storage) for implementing software processes 132, 133 and 134 of DFP 130.

Deciding instant 150 in FIG. 1 is simultaneously executed on three node computers 251, 252 and 253 in a replica deterministic manner in order to be able to mask hardware errors. The results of the three node computers 251, 252 and 253 are transferred to intelligent actuator control 260, which performs a bit-by-bit two-out-of-three vote.

FIG. 3 shows a different hardware structure for implementation of the DFPs in FIG. 1. The boxes in FIG. 2 represent assemblies. The same reference characters in FIG. 3 and FIG. 2 indicate the same elements.

Connecting lines 300 show the communication channels available for transmitting data. In contrast to FIG. 2, in FIG. 3, deciding instance 150 is implemented on two self-checking assemblies 351 and 352. A preferably intelligent actuator control 360 accepts one of the results from 351 or 352. Because the software processes that run on assemblies 351 and 352 are replica deterministic and the hardware of assemblies 351 and 352 check themselves, the results from assemblies 351 and 352 must be identical.

In normal operation, in particular in each frame, at least one of the first trajectories calculated by the first DFP is located within the safe space-time domain (SRZD) that was calculated by the second DFP. In order to be able to recognize a failure or error in the third DFP, which executes the emergency trajectory, it is preferably provided that in normal operation—in particular, in every frame—it is verified whether the emergency trajectory is located within the SRZD. If this is not the case, an alarm signal is transmitted to the driver in order to inform him that the emergency trajectory calculation has failed.

In the case of an error, the trajectories calculated by the first DFP are not located within the safe space-time domain (SRZD) that was calculated by the second DFP. In the case of an error, it cannot be decided whether the first DFP or the second DFP is mistaken. In the case of an error, it then preferably provided that the emergency trajectory is chosen by the deciding instance without verifying whether the emergency trajectory is located within the SRZD.

During ongoing operations, it is very difficult to decide whether an error in the result of one DFP was caused by the two other DFPs or because of an aging error in the hardware or by a software error. At the moment of the occurrence, however, this decision is irrelevant because the proposed architecture masks the two error types.

LITERATURE CITED

[1] US Pat. Application 20160033965 Device and Method for the Autonomous Control of Vehicles, published Feb. 4, 2016
[2] PCT Application PCT/AT2015/050212. Computer system and method for safety-critical applications. Patent application by FTS Computertechnik with the Austrian Patent Office. Sep. 3, 2015.
[3] Austrian Patent Registration A 5073/2016. An error-tolerant method and device for controlling an autonomous technical system by means of diverse trajectory planning. Patent application by FTS Computertechnik with the Austrian Patent Office. Aug. 16, 2016
[4] Wikipedia, Autonomous Driving, retrieved on Aug. 11, 2016
[5] Wikipedia, Automotive Safety Integrity Levels ISO 26262, retrieved on Aug. 11, 2016
[6] FAA. Advisory Circular System Safety Assessment for Part 23 Airplanes. URL: http://www.faa.gov/documentLibrary/media/Advisory_Circular/AC%2023.1309-1E.pdf, retrieved on Aug. 11, 2016
[7] Avizienis, A. The N-Version Approach to Fault-Tolerant Software, IEEE Trans. on Software Engineering, Vol 11, pp. 1491-1501. December 1985
[8] Kopetz, H. Real-Time Systems, Design Principles for Distributed Embedded Applications. Springer Verlag. 2011.

The invention claimed is:

1. A method for operating a controlled object that is embedded in a changing environment, wherein the electronic system that implements the control system includes sensors, actuators, and node computers, which exchange data via a real-time communication system, the method comprising:

periodically observing the controlled object and its environment using sensors and in each frame, at least three independent data flow paths, DFP, are executed based on the data recorded though the observation of the controlled object and its environment, wherein, for each DFP, the observation is carried out via different sensors;

determining, by a first DFP from the data recorded by the observation of the controlled object and its environment via a complex software, a model of the controlled object and of the environment of the controlled object and, on the basis of this model, carries out a trajectory planning in order to create one or a plurality of possible trajectories that, under the given environmental conditions, correspond to a specified task assignment;

determining, by a second DFP from the data recorded by the observation of the controlled object and its environment via a diversitary complex software program, a model of the controlled object and of the environment of the controlled object and, on the basis of this model, determines a safe space-time domain, SRZD, within which SRZD all safe trajectories must be located; and determining, by a third DFP from the data recorded by the observation of the controlled object and its environment, a model of the controlled object and its environment and, on the basis of this model, calculates an emergency trajectory, wherein in normal operation a deciding instance verifies whether the emergency trajectory is located within the safe space-time domain (SRZD).

2. The method according to claim 1, wherein calculations of the deciding instance are executed on TMR hardware.

3. The method according to claim 1, wherein calculations of the deciding instance are executed simultaneously on two independent, self-checking hardware modules.

4. The method according to claim 1, wherein the results of the first and of the second DFPs are submitted to a deciding instance, wherein the deciding instance is implemented by means of a simple software program, and wherein the deciding instance verifies whether at least one of the first trajectories determined by the DFP is safe, meaning is located within the SRZD that was determined by the second DFP, and wherein, in the case that these match, one of the safe trajectories determined by the DFP is chosen, and wherein the deciding instance transfers the target values corresponding to the selected trajectory to an actuator control, and wherein, in the case that these do not match, it waits for the results of at least one following frame, and wherein, in the case that there is also no safe trajectory available in the following frame or the one after that, it switches to an emergency trajectory.

5. The method according to claim 1, wherein the deciding instance, in the case that the emergency trajectory is not available or safe, meaning not located within the SRZD, delivers an alarm message to a user of the controlled object.

6. An electronic system for operating a controlled object that is embedded in a changing environment, wherein the electronic system that implements the control system includes sensors, actuators, and node computers, which exchange data via a real-time communication system, the system comprising:

the controlled object and its environment are periodically observed using sensors and, in each frame, at least three independent data flow paths, DFP, are executed based on the data recorded though the observation of the controlled object and its environment, wherein for each DFP, the observation is carried out via different sensors, and wherein a first DFP determines from the data recorded by the observation of the controlled object and its environment via a complex software program a model of the controlled object and of the environment of the controlled object and, on the basis of this model, carries out a trajectory planning in order to create one or a plurality of possible trajectories that, under the given environmental conditions, correspond to a specified task assignment;

a second DFP determines from the data recorded by the observation of the controlled object and its environment via a diversitary complex software program a model of the controlled object and of the environment of the controlled object and, on the basis of this model, determines a safe space-time domain, SRZD, within which SRZD all safe trajectories must be located; and a third DFP determines from the data recorded by the observation of the controlled object and its environment and, on the basis of this model, calculates an emergency trajectory, wherein in normal operation a deciding instance verifies whether the emergency trajectory is located within the safe space-time domain (SRZD).

7. The system according to claim 6, wherein calculations of the deciding instance are executed on TMR hardware.

8. The system according to claim 6, wherein calculations of the deciding instance are executed simultaneously on two independent, self-checking hardware modules.

9. The system according to claim 6, wherein results of the first and of the second DFPs are transmitted to a deciding instance, wherein the deciding instance is implemented via a simple software program, and wherein the deciding instance verifies whether at least one of the trajectories determined by the first DFP is safe, meaning is located within the SRZD that was determined by the second DFP, and wherein, in the case that these match, one of the safe trajectories determined by the first DFP is selected, and wherein the deciding instance transmits the target values corresponding to the selected trajectory to an actuator control, and wherein, in the case that these do not match, it waits for the results of at least one following frame, and wherein, in the case that there is also no safe trajectory available in the following frame or the one after that, the deciding instance switches to an emergency trajectory.

10. The system according to claim 6, wherein the deciding instance, in the case that the emergency trajectory is not available or is not safe, meaning is not located within the SRZD, transmits an alarm message to a user of the controlled object.

11. The method according to claim 1, wherein the controlled object is a vehicle.

12. The method according to claim 1, wherein the sensors comprise a plurality of sensors, the actuators comprise a plurality of actuators, and the node computers comprise a plurality of node computers.

* * * * *